United States Patent
Catté

(10) Patent No.: US 6,435,415 B1
(45) Date of Patent: *Aug. 20, 2002

(54) CONTACTLESS ELECTRONIC MEMORY CARD

(75) Inventor: Etienne Catté, Saint Cloud (FR)

(73) Assignee: Schlumberger Systemes, Montrouge (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,387

(22) Filed: Jun. 7, 1999

Related U.S. Application Data

(63) Continuation of application No. PCT/FR97/02261, filed on Dec. 10, 1997.

(30) Foreign Application Priority Data

Dec. 11, 1996 (FR) .............................. 96 15192

(51) Int. Cl.⁷ ............................. G06K 19/06
(52) U.S. Cl. ....................... 235/492; 235/488
(58) Field of Search ................. 235/492, 488, 235/487; 29/832; 156/245, 293, 307.3, 299, 310; 340/572.7

(56) References Cited

U.S. PATENT DOCUMENTS

| | | | |
|---|---|---|---|
| 4,539,472 A | * | 9/1985 | Poetker et al. |
| 4,625,102 A | * | 11/1986 | Rebjock et al. ............. 235/492 |
| 4,733,061 A | * | 3/1988 | Hegi |
| 4,754,319 A | * | 6/1988 | Saito et al. |
| 5,030,309 A | * | 7/1991 | Brignet et al. |
| 5,074,947 A | * | 12/1991 | Estes et al. |
| 5,528,222 A | * | 6/1996 | Moskowitz ............... 340/572.7 |
| 5,566,441 A | * | 10/1996 | Marsh et al. |
| 5,585,618 A | * | 12/1996 | Droz .......................... 235/492 |
| 5,689,136 A | * | 11/1997 | Usami et al. ........... 235/492 X |
| 5,856,662 A | * | 1/1999 | Kohama et al. ............. 235/492 |
| 5,880,934 A | * | 3/1999 | Haghiri-Tehrani ...... 235/492 X |
| 5,962,840 A | * | 10/1999 | Haghiri-Tehrani et al. .. 235/492 |
| 6,073,856 A | * | 6/2000 | Takahashi .................... 235/492 |

FOREIGN PATENT DOCUMENTS

| | | | |
|---|---|---|---|
| DE | 196 17 621 | * | 11/1997 |
| EP | 0 690 490 A2 | | 1/1996 |
| EP | 0 706 152 A2 | | 4/1996 |
| EP | 0 737 935 A2 | | 10/1996 |
| JP | 11-105474 | * | 4/1999 |
| WO | WO 95/35207 | | 12/1995 |
| WO | WO 96/07985 | | 3/1996 |

* cited by examiner

Primary Examiner—Michael G. Lee
Assistant Examiner—Jared J. Fureman
(74) Attorney, Agent, or Firm—Cohen, Pontani, Lieberman & Pavane

(57) ABSTRACT

An electronic circuit for an electronic memory card that is capable, without electrical contact, of exchanging information with a reader device. The electronic circuit includes a coupling antenna for communicating with the reader device, and a semiconductor die connected to the antenna. On a support sheet made of plastics material are mounted a coupling antenna provided with two electrical connection terminals; and attached to the electrical connection terminals, a semiconductor die having protruding contacts. A whole intermediate sheet, i.e. one without an opening formed therein, covers the semiconductor die and the support sheet. An outer sheet is placed on the intermediate sheet. The sheets and the semiconductor die are laminated to form a contactless card under heat and pressure such that the semiconductor die becomes embedded into the intermediate sheet.

20 Claims, 4 Drawing Sheets

CONTACTLESS ELECTRONIC MEMORY CARD

CROSS REFERENCE TO RELATED APPLICATIONS

This application is a continuation application of International Application PCT/FR97/02261 filed Dec. 10, 1997.

FIELD OF THE INVENTION

The present invention relates to a method of making a memory card that is capable, without electrical contact, of exchanging information with a reader device.

A particularly advantageous application of the invention is in the field of manufacturing contactless cards, in particular those used as travel tickets or as badges for access to protected premises.

BACKGROUND OF THE INVENTION

In very general terms, information is exchanged between a contactless card and the reader device with which it is associated by remote electromagnetic coupling between a first antenna housed in the body of the contactless card and a second antenna situated in the reader device. The card is also provided with a semiconductor die, or chip, connected to the first antenna and containing, among other things, both a memory in which the information to be provided to the reader device is stored, and means, e.g. a microprocessor, provided to generate the information that is to be transmitted and to process the information that is received.

The contactless cards that are currently in existence are constituted by an electronic circuit in the form of an insert which is usually embedded in a card body made of a plastics material. The insert includes the antenna for coupling the card, the semiconductor die, and an interconnection circuit for interconnecting the antenna and the die. The semiconductor die is generally mounted on the interconnection circuit using a wire bonding technique which consists of connecting the input/output metallizations of the semiconductor die by means of gold wires for example, to the contact areas disposed on the interconnection circuit, and to which there are connected the electrical connection terminals of the coupling antenna. In order to protect the semiconductor die and the connection wires, the assembly is embedded in an insulating resin. The semiconductor die mounted in this way on the interconnection circuit is called an "electronic module".

The antenna itself is made either from wound enamelled wire that is connected to the contact areas of the interconnection circuit, or by means of a printed or etched circuit connected to the interconnection circuit.

The techniques known for making contactless cards that implement an electronic module present the following drawbacks:

(a) The electronic module has to be made beforehand.

(b) The modules are thick because of the loops formed by the connection wires. In addition, the thickness is further increased by the protective molding which is also very costly to make.

(c) Because of the total thickness of the connected and protected semiconductor die, it is difficult, especially if a defect-free surface of the card is to be guaranteed, to mount the electronic module directly on the printed or etched circuit carrying the coupling antenna and to keep the thickness of the card to the ISO standard (760 μm). This last point is all the more critical as plasticization makes it necessary to place the antenna close to the middle of the card and to keep the structures symmetrical in order to prevent the card from bending. For this reason, the module is mounted through the antenna circuit so as to balance the volume of plastics material on each side of the antenna, thereby imposing an additional operation of piercing the printed or etched circuit.

(d) The wound antenna insert is very difficult to plasticize while guaranteeing a good plane surface, and plasticization can only be performed on a unit by unit basis.

(e) For both types of inserts (i.e. with wound antenna and with printed or etched antenna circuit), the dimensions of the module in the plane of the card are very large, generally giving rise to flatness defects in the finished card at the bottom of the module over areas that are also large.

Published European patent application number EP-A3-0 706 152 describes a method of manufacturing a chip card in which the flip-chip technique is used to provide a chip on conductive tracks, e.g. tracks printed on the surface of a thermoplastics film. In that method, each of the intermediate sheets, designed to be superposed on the surface of the thermoplastics film carrying the conductive tracks, has a cutout forming an opening in which the chip is received during a laminating step.

However, in such a method, the opening made in the intermediate sheets must be accurately sized to conform to the dimensions of the chip. In other words, the openings made in the intermediate sheet(s) must be accurately superposed, and the clean edges of the cavity thus formed must be disposed as close as possible to the edges of the chip. Otherwise, temperature differences, or indeed creep of the material, can give rise to deformations on the surface of the card, with such deformations generally resulting in the graphics printed on the surface being spoiled.

It is also noted that injecting resin around the chip, which could enable the space between the chip and the edges of the cavity to be filled, is not easy to achieve given the small size of the space compared with the size of the chip; it is much smaller than that of a micro-module. In addition, such injection would consequently result in increasing the cost of manufacturing the cards.

OBJECT AND SUMMARY OF THE INVENTION

One object of the present invention is to provide an improved electronic memory card that is capable, without electrical contact, of exchanging information with a reader device, the electronic memory card including a coupling antenna for coupling with the reader device, and a semiconductor die connected to the antenna.

Another object of the present invention is to reduce the overall size of the semiconductor die.

A further object of the present invention is to improve the operation of connecting the die to the coupling antenna.

Yet another object of the present invention is to enable the drawbacks relating to openings formed in the intermediate sheet(s) to be avoided.

These and other objects are attained in accordance with one aspect of the present invention which includes, on a support sheet of plastics material, a coupling antenna provided with two electrical connection terminals. A semiconductor die having protruding contacts is mounted on said electrical connection terminals. An intermediate sheet made of plastics material that is designed to cover said semiconductor die is placed on the support sheet thus equipped and constituting said electronic circuit. An outer sheet made of plastics material is placed at least on said intermediate sheet. The set of said sheets is laminated together by the application of heat and pressure.

By implementing the "flip-chip" technique, the semiconductor die is connected to the coupling antenna in a single operation without passing via a connection circuit. Because of the absence of connection wires and of protective embedding, the die remains thin, and its side dimensions remain small (2 mm instead of 15 mm for an electronic module).

In addition, the support sheet carrying the coupling antenna does not need to be cut to prepare an opening for receiving the semiconductor die. Thus, the invention has the advantage of avoiding making an opening in the intermediate sheet. The inventor has been able to establish that, after lamination and because of its small size, the semiconductor die does not produce a noticeable extra thickness in the surface of the outer sheet which lies over the die.

It should also be pointed out that the contactless electronic card of the invention can be made by various production techniques, such as card by card, or in continuous slabs or strips, and the sheets may be of any size.

DETAILED DESCRIPTION OF THE INVENTION

Figure 3:
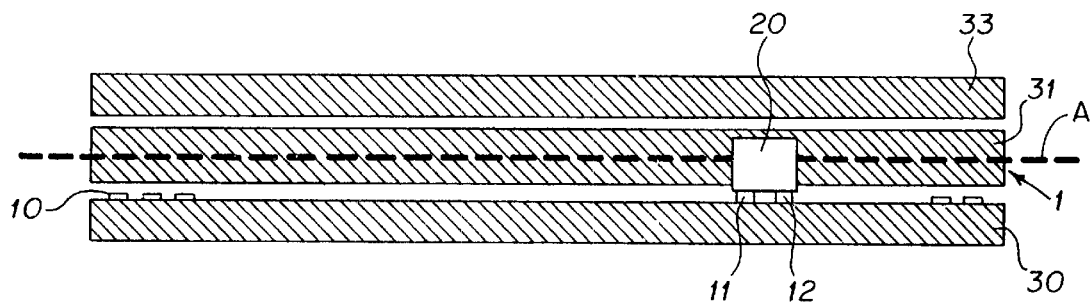
FIG. 3 is a cross-sectional view taken along line I—I of FIG. 5 with sheets 30, 31 and 33 of FIG. 5 joined to form a contactless card of the invention.

The cross-sectional view in FIG. 3 shows the various components of a contactless card made in accordance with one embodiment of the invention. The contactless card is designed to exchange information with a reader device (not shown) without making electrical contact. To this end, the card comprises an electronic circuit 1, as shown in greater detail in FIG. 1, including a coupling antenna 10 for coupling with said reader device, said antenna being formed, together with the electrical connection terminals 11, 12, on a support sheet 30 made of a plastics material.

Figure 1:
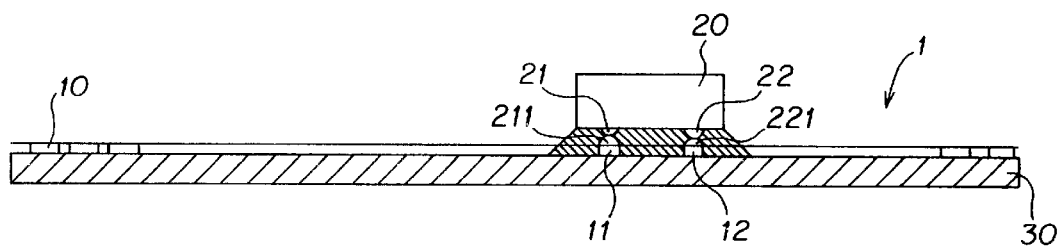
FIG. 1 is a cross-sectional view of a support sheet on which a semiconductor die is mounted, as taken along line I—I in FIG. 5.
Figure 2:
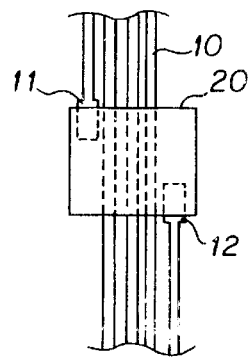
FIG. 2 is a fragmentary plan view showing a "straddling" connection for connecting a semiconductor die onto a coupling antenna.

As shown in FIGS. 1–3, a semiconductor die 20 is mounted on said support sheet 30 using flip-chip technology. The die 20 has already been previously provided with protrusions 211, 221 that are intended to come into contact with the connection terminals II, 12 of the antenna 10.

The coupling antenna 10 can be produced using various techniques, such as printing or etching. However, it is advantageous, in terms of cost and simplicity of implementation, for the antenna to be screen-printed with a conductive ink, without any metal or the like being previously deposited. Naturally, offset technology can also be used. Antennas are thus obtained having Q-factors which are clearly lower than those of printed or etched antennas, but which are completely compatible with the application of contactless cards.

When the protrusions 211, 221 of the semiconductor die 20 are made of metal (gold, copper, aluminum, tin, etc., . . . ), the connection terminals 11, 12 are made of metal, i.e. either metallized, e.g. gold-plated, the die 20 then being mounted by thermo-compression, or tinned using solder and the die then being mounted by soldering. In both cases, the coupling antenna must be metal.

However, thermo-compression and soldering techniques do not allow low cost printed circuits made of plastics material such as PVC, PABS, and polyester to be used because of the temperatures and pressures required. Some of the more expensive plastics, e.g. polyimides, can withstand thermo-compression, but only with thicknesses that are often incompatible with making electronic memory cards to ISO standards. In addition, plastics that can withstand high temperatures are very difficult to replasticize by injection and by heat and pressure for lamination purposes. The laminating technique thus requires the use of adhesives that are very costly for mechanical strength that remains of poor quality (delamination, poor resilience).

For this reason, the semiconductor die 20 having protruding contacts 211, 221 is preferably mounted on the electrical connection terminals 11, 12 of the coupling antenna by means of a conductive adhesive. The electrical connection terminals 11, 12 are coated with conductive adhesive or ink by screen-printing, for example. The die 20 is then attached, and the adhesive is then hot polymerized.

The temperatures required for these adhesives are compatible with the ability of the plastics materials to withstand high temperatures.

The method which makes use of a conductive adhesive has many advantages, including the following:

(a) it is very cheap;

(b) any plastics material can be used, even those that withstand temperature and pressure poorly;

(c) the problem of compatibility between the plastics material of the support sheet 30 of the antenna 10, and the plastics material of the card no longer exists; and (d) the coupling antenna does not have to be made of metal and it can be made of a non-metallic conductive material such as conductive carbon or ink, for example.

The protrusions 211, 221 are preferably made with electrically-conductive polymers which, in the application to electronic memory cards, and from a mechanical point of view, offer improved decoupling of the semiconductor die relative to the body of the card so that strains which are applied to the card body are not transmitted to the die. Naturally, in order to be compatible with the method, the input/output metallizations 21, 22 of the dies must be made from a non-oxidizing metal or from a metal having an electrically-conductive oxide: gold, titanium/tungsten, silver, copper.

Diverse variants can be envisaged depending on the type of conductive polymer forming the protrusions:

a) the polymer can be a silver-filled epoxy resin that is polymerized after screen-printing;

b) the polymer can be a reactivatable silver-filled epoxy resin that is dried after screen-printing, and that is polymerized after assembling the integrated circuit on the insulating substrate of the module; and c) the polymer can be a silver-filled thermoplastic.

As shown in FIG. 2, the semiconductor die 20 having protruding contacts 211, 221 can be mounted to straddle the coupling antenna 10. The use of a very costly double-sided circuit is thus avoided.

As shown in FIG. 3, after forming the antenna 10 on the support sheet 30 and mounting the semiconductor die 20 as described above, the method of the invention envisages placing, on said support sheet 30 constituting the electronic circuit 1, a whole (i.e. without an opening) intermediate sheet 31 made of a plastics material that is designed to cover said semiconductor die. An outer sheet 33 made of a plastics material is then placed on said intermediate sheet 31. Finally, the set of sheets 30, 31, 33 is joined together by applying heat and pressure (referred to herein as "hot rolling") in order to make the card. As explained in greater detail below in connection with FIGS. 9 and 10, the intermediate sheet 31 softens as heat is applied to it. In this state, it admits semiconductor die 20 thereinto as pressure is applied during the hot rolling. The semiconductor die 20 embeds itself into sheet 31 and thus forms a cavity in the thickness of the intermediate sheet 31 without creating any noticeable bulge in the outer sheet 33. The sheets used can all be made of the same plastics material, thereby avoiding the use of adhesives. However, this is not generally the case. The intermediate sheet 31 into which the chip is inserted advantageously has a melting point that is lower than that of the other sheets or layers that are assembled together by hot rolling.

Figure 7:
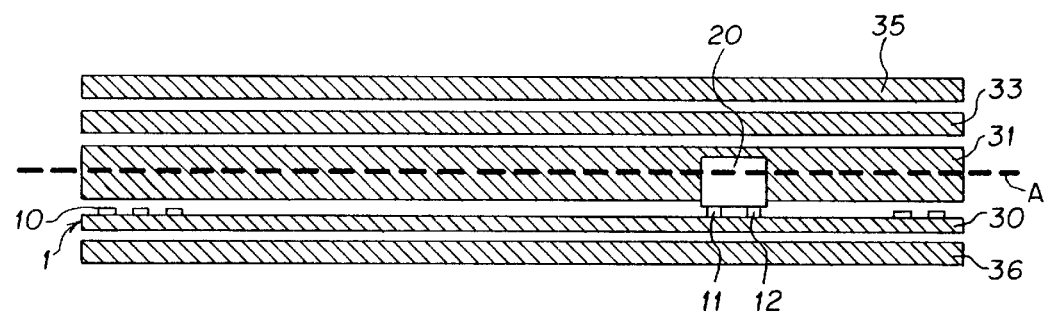
Figure 8:
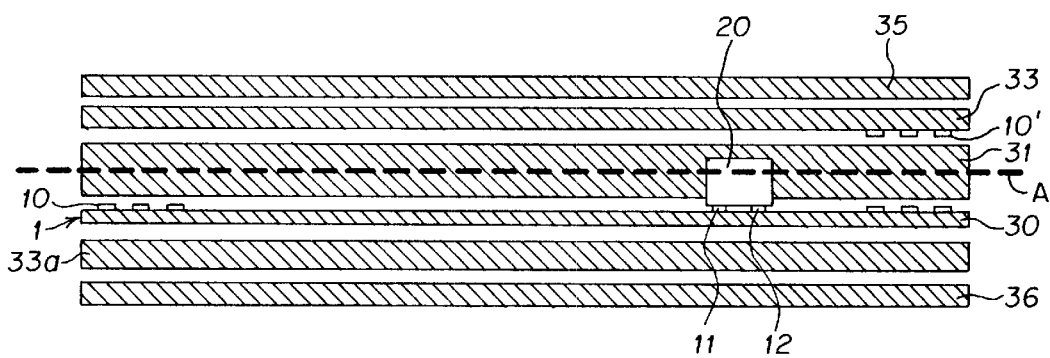

A uniform and symmetrical structure is thus obtained, the plane of symmetry being referenced A in FIG. 3. The advantages of such a structure include the following:

(a) the semiconductor die 20 is very thin compared with that of an electronic module—and because the insert is very thin, structures can be made in which the outer sheets are relatively thick, thereby enabling the outer faces of the cards to be printed without difficulty and with very good yield;

(b) as shown in FIGS. 7 and 8, overlays 35, 36 can be placed on the outer faces of the structure formed by the set of sheets made of plastics material. Such overlays can also be added to a card of the type shown in FIG. 4; and (c) the method enables layers to be produced on which magnetic tracks can be disposed with very good yields.

Figure 4:
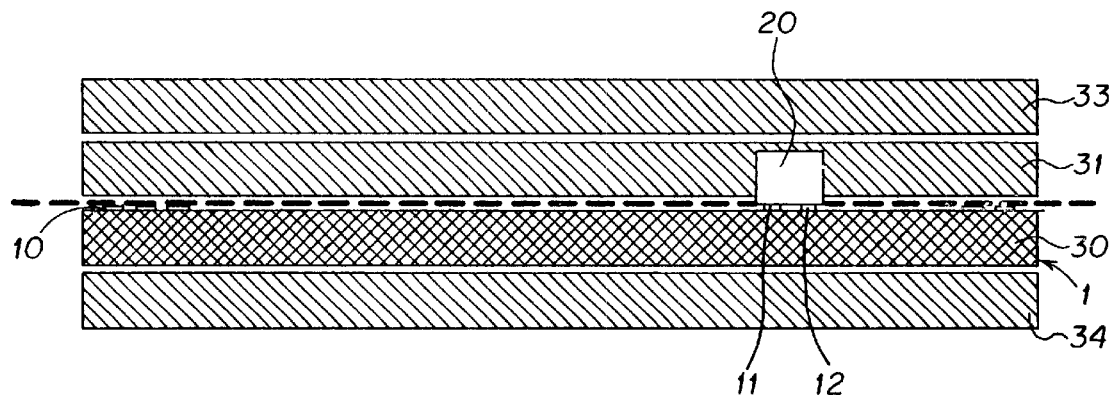
FIG. 4 is a cross-sectional view similar to FIG. 3 but of another embodiment with sheets 30, 31, 33 and 34 of FIG. 5 joined to form a contactless card.
Figure 5:
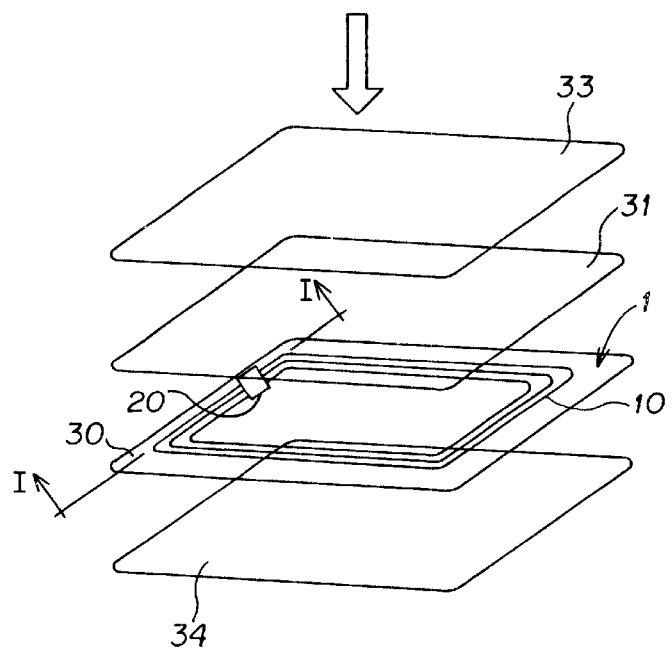
FIG. 5 is an exploded perspective view of the contactless card shown in FIG. 4.
Figure 6:
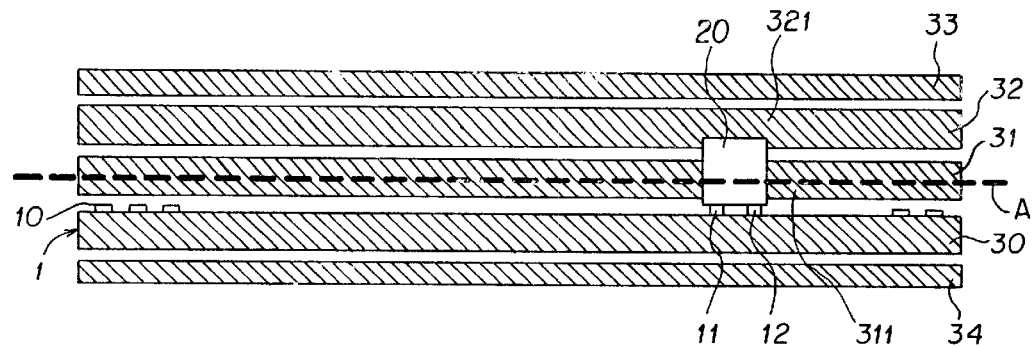
FIGS. 6, 7, and 8 are cross-sectional views of other embodiments of contactless cards.

The embodiment shown in FIG. 3 corresponds to the case where the outer faces are printed after being hot rolled. In contrast, if so desired, the card can be printed before the hot rolling operation, for example, in which case a preprinted second outer sheet 34 is placed against the support sheet 30, on the side opposite from the intermediate sheet 31, with the first outer sheet 33 also being preprinted. This is shown in FIGS. 4 and 5. FIG. 6 shows that, if necessary, it is possible to use a second intermediate sheet 32. In this case, an outer sheet 34 is advantageously placed under the support sheet 30 so as to make the structure symmetrical.

As shown in FIG. 8, in order to ensure that the structure of the card is as symmetrical as possible, a winding 10' similar to the antenna 10, can be produced on the sheet 33, that is symmetrical to the support sheet 30 relative to the intermediate sheet 31 adjacent to the support sheet 30. Winding 10' is not connected to electronic circuit 1, but is useful to provide symmetry relative to center line A in order to prevent the card from bending. It is, thus, possible to produce large metal antennas without a substantial risk of the cards bending.

In an implementation of the invention, the sheet 30 on which the chip rests is made of PVC, and has a thickness of about 200 μm. The sheet 30 has a melting point of about 82° C. (Vicat point). This melting point is much higher than the melting point of the sheet 31 in which the chip is to be inserted, and which is also made of PVC. The melting point of said sheet 31 is about 65° C.

As shown in FIG. 8, two "outer" sheets are applied, one (sheet 33a) on the bottom face of the sheet 30 and the other (sheet 33) on the top face of the sheet 31. Each of the outer sheets 33 and 33a has a thickness of about 50 μm, is made of polycarbonate and its melting point (Vicat point) is about 140° C. Thus, with the temperature for lamination being set so that only sheet 31 reaches its melting point, all of the sheets remain substantially intact with the exception of said sheet 31 in which the chip has been inserted. Two thin overlays 35 and 36 having a thickness of about 50 μm are then placed so as to cover the set of assembled sheets. The two thin overlays are generally thermosettable.

A preferred approach for manufacturing a contactless card in accordance with the invention will be described in connection with FIGS. 9 and 10. These -drawings depict the embodiment of FIG. 8, but generally the same technique can be applied to any of the embodiments disclosed herein.

The preferred method simultaneously manufactures a plurality of contactless cards by using large sheets which are then cut to form a plurality of cards of the desired size. For example, such a sheet is 32 cm in length and 22 cm in width.

Figure 9:
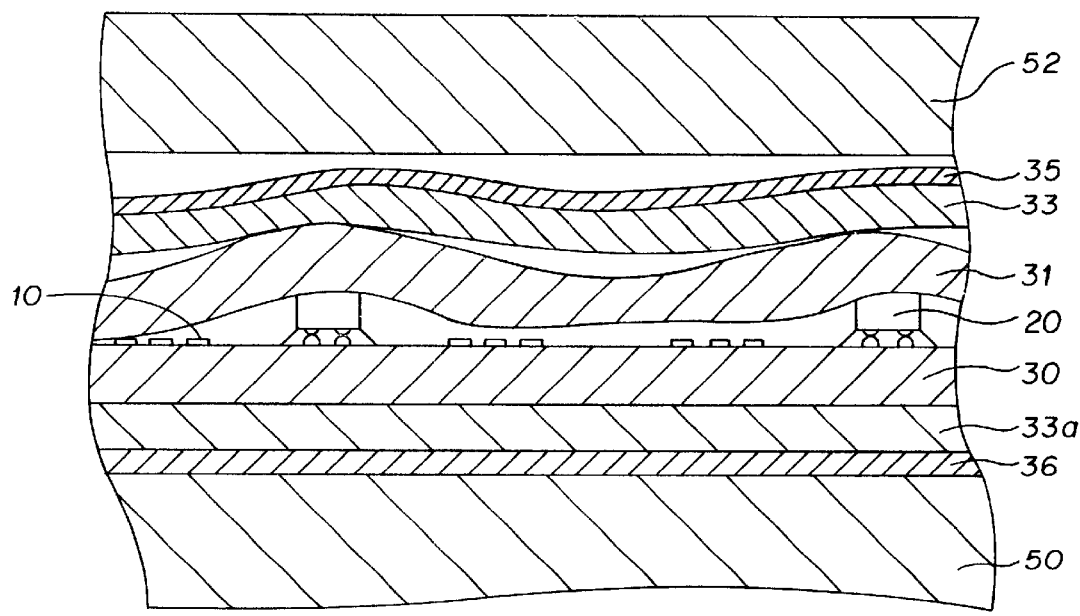
FIG. 9 illustrates how the contactless card of FIG. 8 is manufactured.

Turning to FIG. 9, it shows a metallic base plate 50 on which overlay sheet 36 is spread out. Bottom outer sheet 33a is then spread on top of sheet 36. Support sheet 30 on which a plurality of antennas 10 and semiconductor dies 20 have been mounted is then placed on sheet 33a. The technique for mounting antenna 10 and die 20 to sheet 30 has been described in detail above.

In accordance with a key aspect of the invention, intermediate sheet 31 is spread out to cover support sheet 30 and all the antennas and semiconductor dies mounted to it. Sheet 31 has no openings made therein to receive the dies but, rather, sheet 31 lies on the dies 20.

Upper outer sheet 33 is then spread onto intermediate sheet 31, and overlay 35 is used to cover sheet 33. Finally, a metallic upper plate 52 is brought into position to engage overlay 35.

With the sheets being arranged as per the above, plates 50 and 52 are subjected to the following cycle of temperature and pressure:

(1) 10 mins. at 130° C. and 10 bars;

(2) 7 mins. during which the pressure is increased to 100 bars while the temperature remains at 130° C.;

(3) 4 mins. at 130° C. and 10 bars;

(4) the temperature is decreased to 20° C.;

(5) when the temperature reaches 20° C., the pressure is gradually increased to 200 bars during a period of 18 mins; and (6) the pressure is returned to ambient pressure.

The above-described temperature and pressure conditions are designed to have the intermediate sheet reach a softening point so that the semiconductor die can embed itself into the sheet under the influence of the applied pressure.

Once steps (1) to (6) are completed, the laminated product is removed from between plates 50 and 52, and the contactless cards, for example 10 cards, are cut to the desired shape and size.

Figure 10:
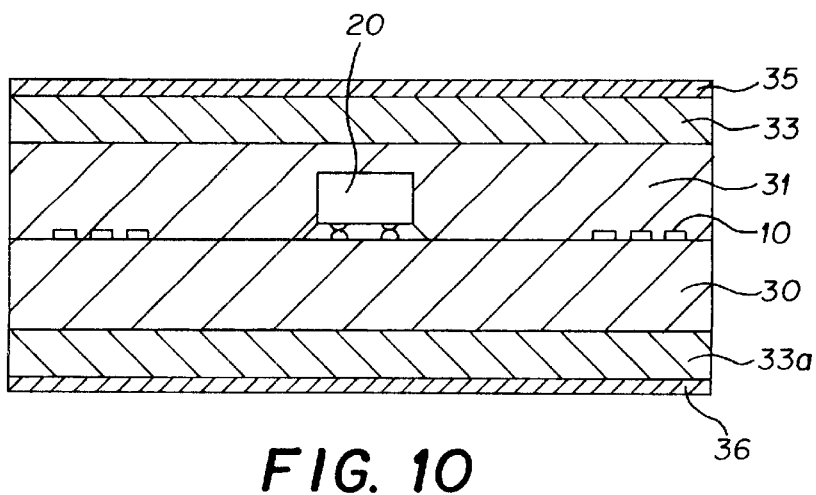
FIG. 10 shows the result of applying heat and pressure to the arrangement of FIG. 9.

FIG. 10 shows the final result achieved with the above-described method. It is similar to FIG. 8 which, however, shows the various components in a slightly exploded view. FIG. 10 shows the finished card as it actually looks in cross section. In particular, as can readily be appreciated from FIG. 10, die 20 is secured in place and received within sheet 31 even though no opening was cut into sheet 31. Moreover, due to the melting of sheet 31 and the application of pressure via plates 50 and 52, the molten material of sheet 31 flows into tight engagement with the exterior of die 20.

Thus, in comparison to the prior art disclosed in published European patent application number EP-A3-0 706 152, the invention enables the advantages of the flip-chip to be combined with advantages of a technique of joining materials (e.g. by hot rolling) having various melting points by eliminating the need for an opening in the intermediate sheet, by eliminating alignment of the opening with the chip, and by not requiring any resin to be injected. The chip is perfectly inserted into the volume of plastic in the memory card. Twisting and bending stresses are equalized, thereby enabling the assembly to have good mechanical strength.

When the intermediate sheet does not include a previously formed opening into which the chip is inserted, said chip is inserted into the melted sheet during the hot rolling for lamination purposes in such a manner that the chip is firmly held by its edges coming into contact with the sheet. The twisting and bending stresses are thus evenly transmitted via said edges into the card. The fact that, in the invention, the chip is advantageously placed on the neutral axis, i.e. in plane A where the stresses are at a minimum, is then of particular importance.

It is also noted that the system is further improved if the two outer sheets have melting points that are higher than those of the inner sheets.

I claim:

1. A method of making an electronic memory card that, without electrical contact, exchanges information with a reader device, said electronic memory card including a coupling antenna for coupling with said reader device, and a semiconductor die connected to said antenna, the method comprising the steps of:
   a) forming on a support sheet of plastics material, a coupling antenna provided with two electrical connection terminals;
   b) mounting, on said electrical connection terminals, a semiconductor die having protruding contacts engaging said terminals;
   c) placing, on the support sheet, an intermediate sheet, made of a uniform layer of the same plastics material and without a reinforcer being included in such layer, that covers said semiconductor die, the intermediate sheet being non-perforated and covering the semiconductor die and having a surface area with no cavity therein sized to receive the semiconductor die, said intermediate sheet having a melting point that is lower than the melting point of the support sheet;
   d) placing an outer sheet made of plastics material at least on said intermediate sheet; and
   e) laminating the support sheet and outer sheet together by applying heat and pressure, and embedding the semiconductor die is embedded within a cavity formed in said surface area of the intermediate sheet as a result of the laminating step.

2. A method according to claim 1, wherein the semiconductor die having protruding contacts is mounted to straddle the coupling antenna.

3. A method according to claim 1, wherein said semiconductor die having protruding contacts is mounted to the electrical connection terminals of the coupling antenna by means of a conductive adhesive.

4. A method according to claim 1, wherein the coupling antenna is made by means of a conductive ink, by screen-printing or offset-printing.

5. A method according to claim 1, wherein the coupling antenna is made of a non-metallic conductive material, including carbon.

6. A method according to claim 1, wherein the protrusions of the semiconductor die are made of conductive polymer.

7. A method according to claim 1, wherein steps c) and d) comprise placing two intermediate sheets on the support sheet and placing a first outer sheet on the intermediate sheets and a second outer sheet on the support sheet.

8. A method according to claim 1, further comprising the step of placing another outer sheet made of plastics material on said support sheet, and wherein, after step d), placing an overlay over each outer face of the outer sheets.

9. A method according to claim 1, wherein the intermediate sheet is made of the same material as at least the outer sheet.

10. A method according to claim 1, wherein a winding is provided on the outer sheet, the outer sheet being symmetrical to the support sheet relative to the intermediate sheet adjacent to the support sheet, and said winding being opposed to said coupling antenna.

11. The method of making an electronic memory card according to claim 1, wherein the intermediate sheet has a melting point that is lower than the melting point of the outer sheet.

12. The method of claim 1, wherein said plastics material of the intermediate sheet is PVC.

13. An electronic memory card that, without electrical contact, exchanges information with a reader device, said electronic memory card comprising:
   a coupling antenna for electrically coupling with said reader device;
   a semiconductor die coupled to said antenna;
   on a support sheet of plastics material, the coupling antenna having two electrical connection terminals;
   on said two electrical connection terminals, the semiconductor die having protruding contacts;
   an intermediate sheet on said support sheet and having a cavity therein, said intermediate sheet being made of a uniform layer of the same plastics material and without a reinforcer being included in such layer, said intermediate sheet having a melting point that is lower than a melting point of the plastics material of the support sheet, said semiconductor die being embedded within said cavity formed in a surface area of said intermediate sheet as a result of hot rolling, and having no such cavity therein to receive the semiconductor die prior to the hot rolling; and
   an outer sheet made of plastics material at least on said intermediate sheet.

14. The electronic memory card according to claim 13, wherein the intermediate sheet is non-perforated.

15. The electronic memory card of claim 13, wherein said plastics material of the intermediate sheet is PVC.

16. An electronic memory card that, without electrical contact, exchanges information with a reader device, comprising:
   a coupling antenna electrically coupling said electronic memory card with said reader device;

a semiconductor die coupled to said coupling antenna;

a support sheet for supporting said coupling antenna, said support sheet having two electrical connection terminals thereon electrically coupled to said coupling antenna, the semiconductor die having protruding contacts on said two electrical connection terminals; and an intermediate sheet covering said support sheet and said semiconductor die, the intermediate sheet being non-perforated and having a cavity therein;

wherein the intermediate sheet is made of a uniform layer of the same plastics material and without a reinforcer being included in such layer; and wherein the semiconductor die is embedded within said cavity in a surface area of the intermediate sheet formed by hot rolling of the electronic memory card, and having no such cavity therein prior to the hot rolling.

17. The electronic memory card according to claim 16, further comprising an outer sheet made of a plastics material placed on said intermediate sheet.

18. The electronic memory card according to claim 17, wherein the intermediate sheet has a melting point that is lower than the melting point of the outer sheet.

19. The electronic memory card according to claim 16, wherein the melting point of the intermediate sheet is lower than the melting point of the support sheet such that the semiconductor die is embedded in the intermediate sheet as a result of hot rolling.

20. The electronic memory card of claim 16, wherein said plastics material of the intermediate sheet is PVC.

* * * * *